US008899224B2

(12) United States Patent
Cowles

(10) Patent No.: US 8,899,224 B2
(45) Date of Patent: Dec. 2, 2014

(54) SUBMERGIBLE COMBUSTION BURNER

(71) Applicant: Curtis Richard Cowles, Corning, NY (US)

(72) Inventor: Curtis Richard Cowles, Corning, NY (US)

(73) Assignee: Corning Incorporated, Corning, NY (US)

( * ) Notice: Subject to any disclaimer, the term of this patent is extended or adjusted under 35 U.S.C. 154(b) by 90 days.

(21) Appl. No.: 13/852,600

(22) Filed: Mar. 28, 2013

(65) Prior Publication Data

US 2013/0220300 A1    Aug. 29, 2013

Related U.S. Application Data

(63) Continuation of application No. 12/250,151, filed on Oct. 13, 2008, now Pat. No. 8,408,197.

(51) Int. Cl.
| | |
|---|---|
| *F24H 1/20* | (2006.01) |
| *F23C 3/00* | (2006.01) |
| *F23C 5/08* | (2006.01) |
| *F23D 14/22* | (2006.01) |
| *F23D 14/78* | (2006.01) |
| *C03B 5/235* | (2006.01) |
| *F27B 3/20* | (2006.01) |

(52) U.S. Cl.
CPC ............... *F24H 1/206* (2013.01); *F23C 3/004* (2013.01); *F23C 5/08* (2013.01); *F23D 14/22* (2013.01); *F23D 14/78* (2013.01); *C03B 5/2353* (2013.01); *C03B 5/2356* (2013.01); *F27B 3/205* (2013.01); *C03B 2211/22* (2013.01); *C03B 2211/23* (2013.01)

USPC ............. 126/360.1; 126/350.1; 431/350; 431/284; 431/187

(58) Field of Classification Search
CPC ............ F23C 3/004; F23C 7/00; F23D 14/22; F23D 14/32; F23D 14/26; F23D 14/08
USPC ............. 126/360.1, 350.1; 431/350, 284, 187
See application file for complete search history.

(56) References Cited

U.S. PATENT DOCUMENTS

| | | | | |
|---|---|---|---|---|
| 1,239,681 | A | 8/1915 | English | |
| 2,655,206 | A | 2/1949 | Eichelman | 158/27.4 |
| 3,110,584 | A | 11/1963 | Sanders | 75/42 |
| 3,170,781 | A | 2/1965 | Keefer | |
| 3,260,587 | A | 7/1966 | Dolf et al. | |
| 3,439,997 | A | 4/1969 | Hancock | 431/350 |
| 3,606,825 | A * | 9/1971 | Johnson | 65/134.4 |
| 4,434,976 | A | 3/1984 | Murakami et al. | 266/268 |

(Continued)

FOREIGN PATENT DOCUMENTS

| | | | | |
|---|---|---|---|---|
| EP | 0117029 | 8/1984 | | F23C 3/00 |
| EP | 1422473 | 5/2004 | | F23C 3/00 |

(Continued)

*Primary Examiner* — Avinash Savani
(74) *Attorney, Agent, or Firm* — Ryan T. Hardee

(57) ABSTRACT

A burner apparatus includes a first tube having a first longitudinal bore and a second tube having a second longitudinal bore. The second tube is disposed within the first longitudinal bore such that an annular space is defined between the second tube and the first tube. The burner apparatus further includes a nozzle formed at a tip of the second tube. A plurality of side holes are formed in the nozzle. The side holes are slanted relative to a longitudinal axis of the nozzle and are in communication with the second longitudinal bore.

19 Claims, 6 Drawing Sheets

(56) References Cited

U.S. PATENT DOCUMENTS

| | | | |
|---|---|---|---|
| 4,539,034 A | 9/1985 | Hanneken | |
| 4,726,760 A | 2/1988 | Skoog | 431/8 |
| 4,878,829 A | 11/1989 | Anderson | 431/8 |
| 5,186,620 A | 2/1993 | Hollingshead | 431/354 |
| 5,472,145 A | 12/1995 | Shannon et al. | 239/552 |
| 5,573,392 A | 11/1996 | Paikert et al. | 431/9 |
| 5,587,283 A | 12/1996 | Karinthi et al. | 431/10 |
| 5,597,298 A | 1/1997 | Snyder et al. | 431/8 |
| 5,944,507 A | 8/1999 | Feldermann | 431/189 |
| 6,068,470 A | 5/2000 | Zarzalis et al. | 431/187 |
| 6,132,204 A | 10/2000 | Snyder et al. | 431/174 |
| 6,604,937 B1 | 8/2003 | Mahoney | 431/8 |
| 6,951,454 B2 | 10/2005 | Sarv et al. | 431/9 |
| 7,273,583 B2 | 9/2007 | Rue et al. | |
| 2005/0236747 A1 | 10/2005 | Rue et al. | 266/217 |

FOREIGN PATENT DOCUMENTS

| | | | |
|---|---|---|---|
| GB | 2066445 | 7/1981 | F23D 11/40 |
| JP | 62-193285 | 8/1987 | H01L 29/80 |
| JP | 2002286225 | 3/2002 | F23L 1/00 |

\* cited by examiner

SUBMERGIBLE COMBUSTION BURNER

CROSS-REFERENCE TO RELATED APPLICATIONS

This application is a continuation of and claims the benefit of priority to U.S. application Ser. No. 12/250,151, filed on Oct. 13, 2008, the content of which is relied upon and incorporated herein by reference in its entirety.

FIELD

The invention relates generally to the field of submerged combustion melting. More specifically, the invention relates to a burner for use in submerged combustion melting.

BACKGROUND

In submerged combustion melting, a burner is used to inject a flame into a pool of molten material. The flame diffuses upwardly through the molten pool, carrying with it thermal energy for intimate heating of the molten pool. In some cases, the molten pool can begin to freeze at the point where the flame is injected into the molten pool. The freeze can extend upwardly toward the top surface of the molten pool, forming what is known as a "cold finger." Once a cold finger forms in the molten pool, it is normally not reversible and often requires that the melting process be restarted.

SUMMARY

In one aspect, the invention relates to a burner apparatus which comprises a first tube having a first longitudinal bore and a second tube having a second longitudinal bore. The second tube is disposed within the first longitudinal bore such that an annular space is defined between the second tube and the first tube. The burner apparatus further includes a nozzle formed at a tip of the second tube. The nozzle comprises a plurality of side holes formed therein. The side holes are slanted outwardly relative to a longitudinal axis of the nozzle and are in communication with the second longitudinal bore.

In another aspect, the invention relates to a submerged combustion melting apparatus which comprises a melting chamber for containing a molten pool. The melting chamber has an orifice formed in its wall. A burner as described above is positioned at the orifice to inject a flame into the melting chamber.

Other features and advantages of the invention will be apparent from the following description and the appended claims.

BRIEF DESCRIPTION OF DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

Figure 1:
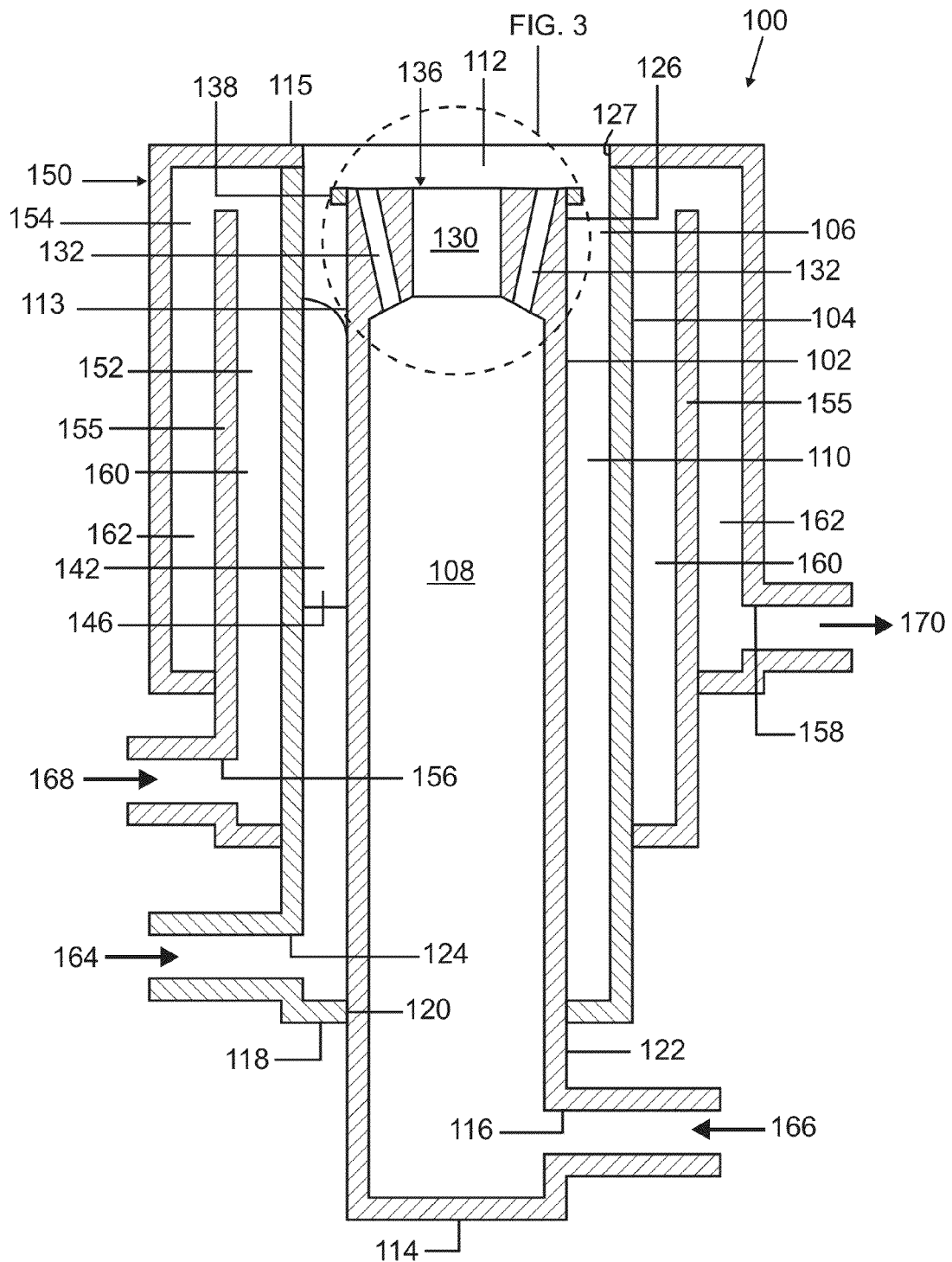
FIG. 1 depicts a vertical cross-section of a burner apparatus.

The invention will now be described in detail with reference to a few embodiments, as illustrated in the accompanying drawings. In describing the embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 2:
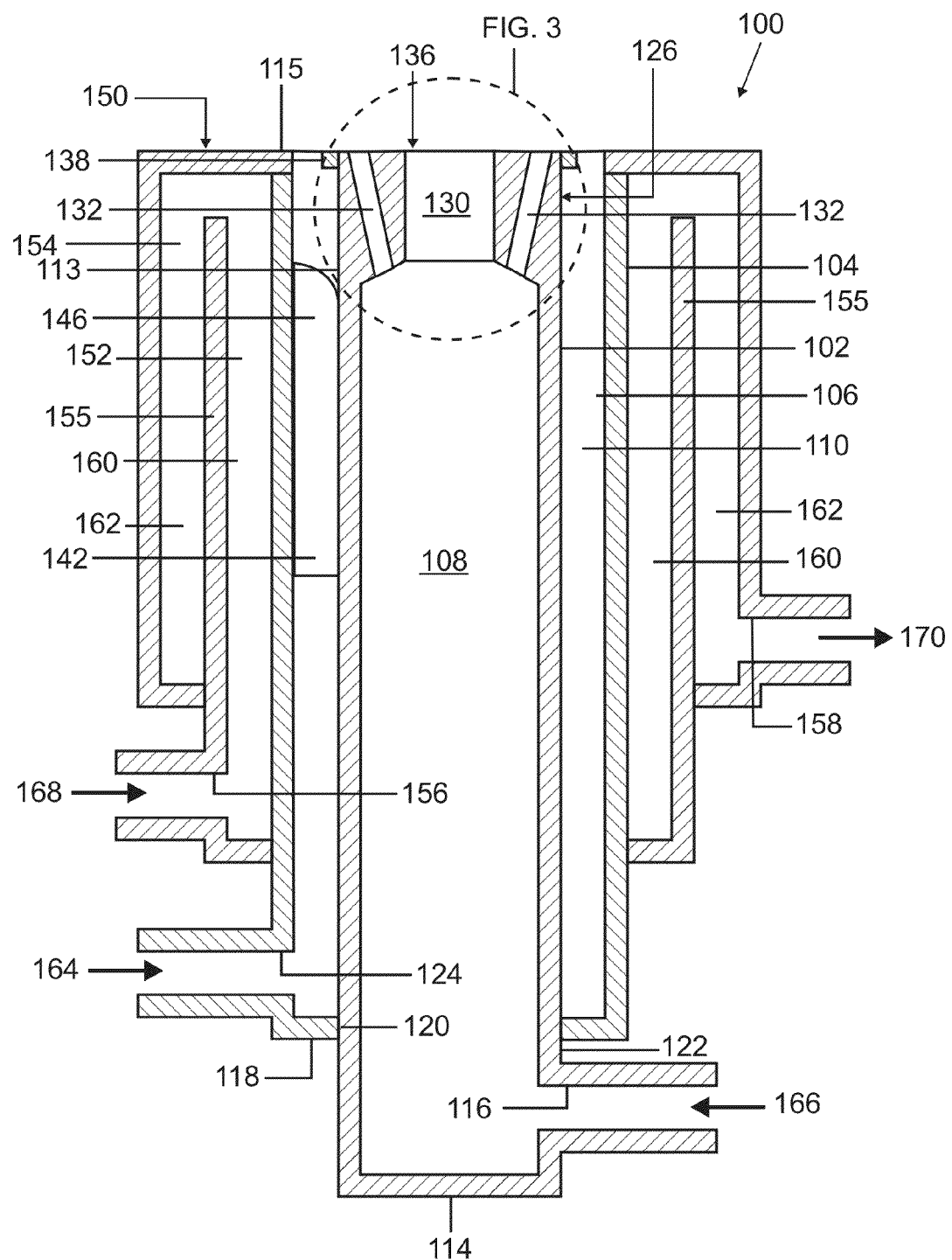
FIG. 2 depicts a vertical cross-section of a second example of a burner apparatus.

FIGS. 1 and 2 depict a burner apparatus 100 including an inner tube 102 and an outer tube 104. The inner tube 102 and outer tube 104 may be made of a heat-resistant material, such as a stainless steel, e.g. 304, 312, or other high temperature stainless steel, austenitic nickel-chromium-iron alloys, e.g. Inconel®. The outer tube 104 has a longitudinal bore 106 inside which the inner tube 102 is disposed. The inner tube 102 also has a longitudinal bore 108. Typically, the longitudinal axis of the bore 106 is coincident with the longitudinal axis of the bore 108, i.e., the outer tube 104 and inner tube 102 are coaxial or concentric. The outer diameter of the inner tube 102 is smaller than the inner diameter of the bore 106, resulting in an annular space 110 between the outer tube 104 and the inner tube 102. Gases, e.g., fuel and oxidant, can be supplied to the annular space 110 and the bore 108 during operation of the burner apparatus 100. Typically, the gas in the bore 108 will be different from the gas in the annular space 110. For example, natural gas could be flowed in the bore 108 while oxygen is flowed in the annular space 110, or vice versa. The tip 113 of the inner tube 102 includes a nozzle 126. In the example shown in FIG. 1, the nozzle 126 is recessed relative to the top surface 115 of the burner apparatus 100. The space 112 above the nozzle 126 defines a combustion chamber 112 in which the gases from the bore 108 and annular space 110 combine and undergo combustion. In the example shown in FIG. 2, the nozzle 126 is flush or substantially flush with the top surface 115 of the burner apparatus 100. Thus, convergence and combustion of the gases in the bore 108 and annular space 110 take place outside of the burner apparatus 100. Returning to FIG. 1, the corners of the wall 127 defining the combustion chamber 112 could be hard corners as illustrated, but more often would be filleted or radiused.

Referring to FIGS. 1 and 2, the inner tube 102 has a closed bottom end 114, which seals the bottom of the bore 108 in these embodiments. Near the bottom end 114, the inner tube 102 includes a port 116, which is in communication with the bore 108. An external source of gas (not shown), e.g., a source of fuel, can be connected to the port 116 in order to supply gas to the bore 108. In other embodiments, the closed bottom end 114 could include a port for introduction of gas into the bore 108. The outer tube 104 has a partially closed bottom end 118 with an opening 120 for receiving the inner tube 102. The bottom end 118 seals the bottom of the annular space 110 by extending between the outer tube 104 and the inner tube 102. In the examples shown in FIGS. 1 and 2, a bottom portion 122 of the inner tube 102 including the port 116 extends below the bottom end 118 of the outer tube 104. The inner tube 102 may be capable of sliding relative to the opening 120 so that adjustment of the position of the inner tube 102 relative to that of the outer tube 104 is possible, e.g., in order to control the size of the combustion chamber 112. Near the bottom end 118, the outer tube 104 includes a port 124, which is in communication with the annular space 110. An external source of gas (not shown), e.g., a source of oxidant, can be connected to the port 124 in order to supply gas to the annular space 110. Alternatively, the bottom end 118 may include a port for introduction of gas into the bore 108.

Figure 3:
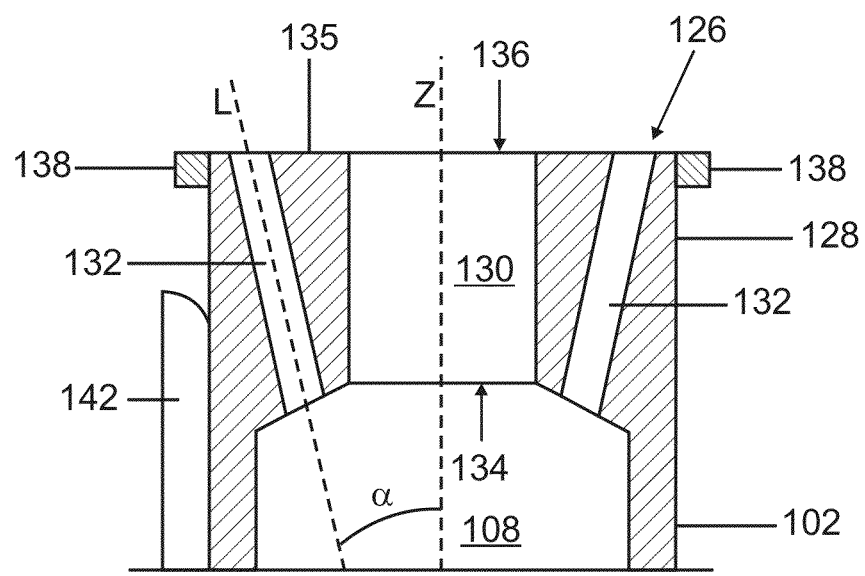
FIG. 3 depicts an enlarged, vertical cross-section of a nozzle included in the burner apparatus of FIGS. 1 and 2.
Figure 4A:
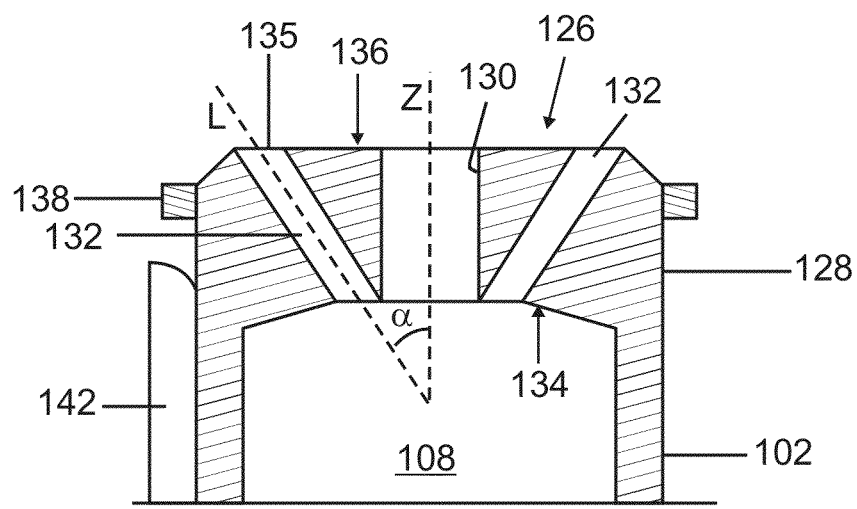
FIG. 4A depicts a vertical cross-section of a second example of a nozzle.
Figure 4B:
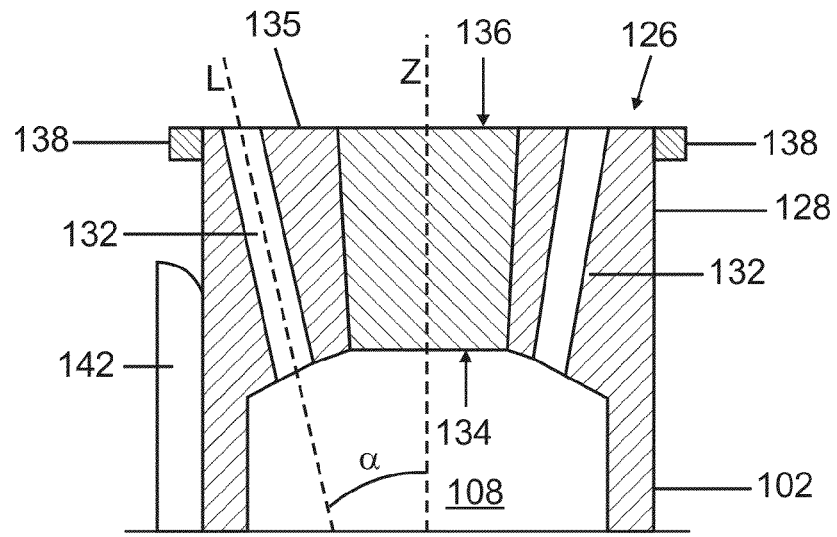
FIG. 4B depicts a vertical cross-section of a third example of a nozzle.
Figure 5:
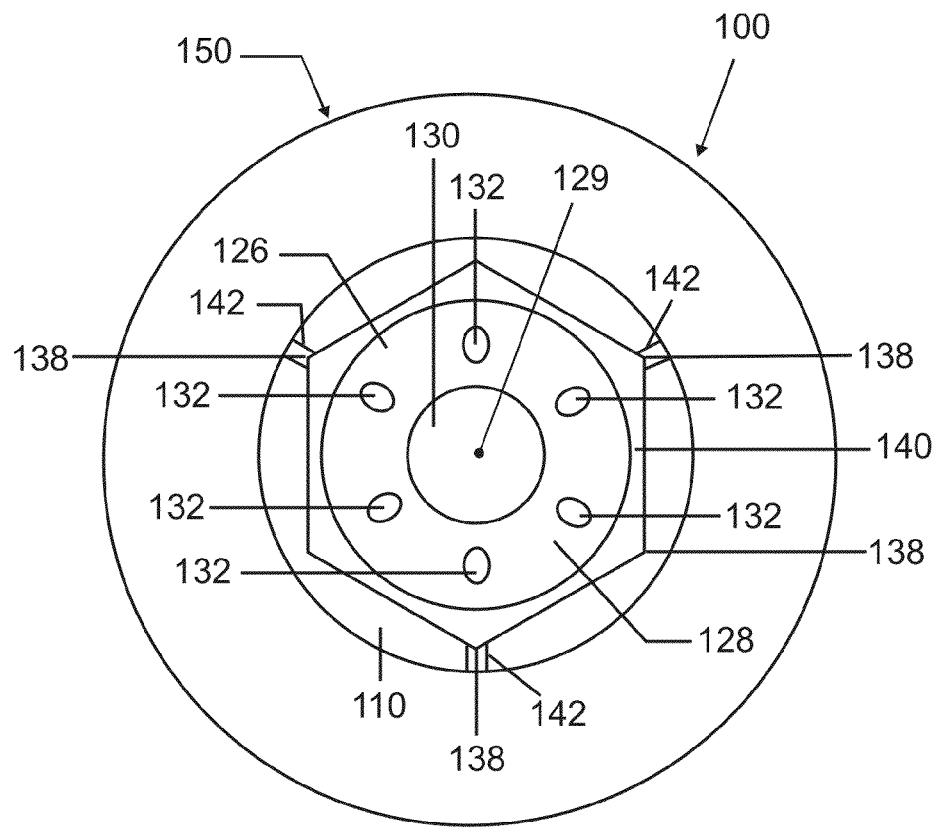
FIG. 5 depicts a top view of the burner apparatus of FIGS. 1 and 2.

Referring to FIG. 3, the nozzle 126 (formed at the tip of the inner tube 102 in FIGS. 1 and 2) includes a nozzle body 128 having a central hole 130 and side holes 132. The holes 132 are called "side" holes because they are offset from the center of the nozzle body 128. The side holes 132 are provided in the nozzle body 128 for gas flow. In one embodiment, the central hole 130 is also provided in the nozzle body 128 for gas flow. In other embodiments, the central hole 130 may be absent or plugged (as illustrated in FIG. 4B), leaving only the side holes 132 open for gas flow. When the central hole 130 is present in the nozzle body 128, it may serve as an opening for gas flow or as a receptacle or passage for instruments such as a UV safety sensor. Referring to FIG. 5, the side holes 132 are distributed around the center 129 of the nozzle body 128. In the illustrated embodiment, the side holes 132 are generally equidistant from the center 129 of the nozzle body 128. In other embodiments, the side holes 132 may not be equidistant from the center 129 of the nozzle body 128 (see, for example, FIG. 4B, where the line Z indicates the center of the nozzle body 128). In FIGS. 3, 4A, and 4B, the side holes 132 are slanted relative to the vertical (or longitudinal axis of the nozzle 126), Z. The longitudinal axis of the nozzle 126 is in a direction running from the inlet face 134 of the nozzle body 128 to the outlet face 136 of the nozzle body 128 and is located generally in the center of the nozzle 126. In one embodiment, the angle α between the each of the side holes 132 and the vertical, Z, may be in a range from about 25° to 65°. In another embodiment, the angle α between the each of the side holes 132 and the vertical, Z, may be in a range from about 30° to 60°. In yet another embodiment, the angle α between the each of the side holes 132 and the vertical, Z, may be in a range from about 45° to 50°. In the embodiment illustrated in FIG. 4A, the angle α between each of the side holes 132 and the vertical, Z, is 45° or approximately 45°. The side holes 132 may be slanted at the same or different angles relative to the vertical, Z.

The inlet face 134 of the nozzle body 128 faces the bore 108, while the outlet face 136 of the nozzle body 128 faces the exterior of the inner tube 102. In FIGS. 3 and 4A, the central hole 130 extends from the inlet face 134 to the outlet face 136 of the nozzle body 128 and communicates with the bore 108. In FIGS. 3, 4A, and 4B, the side holes 132 extend from the inlet face 134 to the outlet face 136 and also communicate with the bore 108 at the inlet face 134. At the outlet face 136 of the nozzle body 128, the side holes 132 and central hole 130 may have any desired shape, such as circular, square, rectangular, or oval. In one embodiment, as illustrated more clearly in FIG. 5, the side holes 132 terminate at the outlet face 136 with an elongated shape, e.g., oval, in order to reduce or eliminate overheating of the outlet face 136. Referring to FIGS. 3, 4A, and 4B, where the side holes 132 are circular in cross-section (or have any other non-elongated cross-section, e.g., square), the elongated shape at the outlet face 136 may be achieved by making the portion 135 of the outlet face 136 including the side holes 132 oblique (i.e., not parallel or perpendicular) to the longitudinal axis, L, of the side holes 132. In one example, the portion 135 can be made horizontal or substantially horizontal relative to the vertical (or longitudinal axis of the nozzle 126), Z, to achieve the elongated shape of the side holes 132 at the outlet face 136.

Returning to FIGS. 1 and 2, the cross-sectional flow area of the annular space 110 and the cross-sectional flow area of the nozzle 126 should be selected such that the pressure in the annular space 110 and the pressure in the bore 108 are equalized or substantially equalized. For example, when the inner tube 102 carries natural gas and the annular space 110 carries oxygen, the cross-sectional flow area of the annular space 110 can be approximately twice the cross-sectional area of the nozzle 126 to allow the aforementioned equalization of pressure. The cross-sectional flow area of the nozzle 126 is determined by the combined cross-sectional flow areas of the side holes 132 and the cross-sectional flow area of the central hole 130, if present and used as an opening for gas flow.

The side holes 132 serve the purpose of laterally broadening the flow coming out of the nozzle 126. At the outlet face 136 of the nozzle 126, the broadened flow combines with the flow from the annular space 110, resulting in a broadened flame. The flame produced by the burner apparatus 100 can be made even broader by providing protuberances 138 on the exterior of the nozzle 126. The protuberances 138 spread the flow at the exterior of the nozzle 126. The protuberances 138 may be formed on or otherwise attached to the nozzle 126. In one example, as shown more clearly in FIG. 5, the corners of a polygonal flange 140 mounted on the nozzle 126 function as the protuberances 138. The corners 138 may be sharp or rounded. Returning to FIGS. 1 and 2, the protuberances 138 may be flush or substantially flush with the outer edge of the outlet face 136 of the nozzle 126 so that the flow spreading provided by the protuberances is near enough to the outlet face 136 of the nozzle 126 to have an effect on the quality of the flame produced by the burner apparatus 100. The nozzle 126, as described above, allows a short, broad flame to be produced by the burner apparatus 100. This short, broad flame can help eliminate or reduce the occurrence of a cold finger when the burner apparatus 100 is used in submerged combustion melting. It is important not to spread the flame of the burner too much so that a low pressure area does not form at the center of the flame. The spreading of the flame is determined at least in part by the size and angle of the side holes 132, the size of the central hole 130 if present, and the size and positioning of the protuberances if present.

Figure 6:
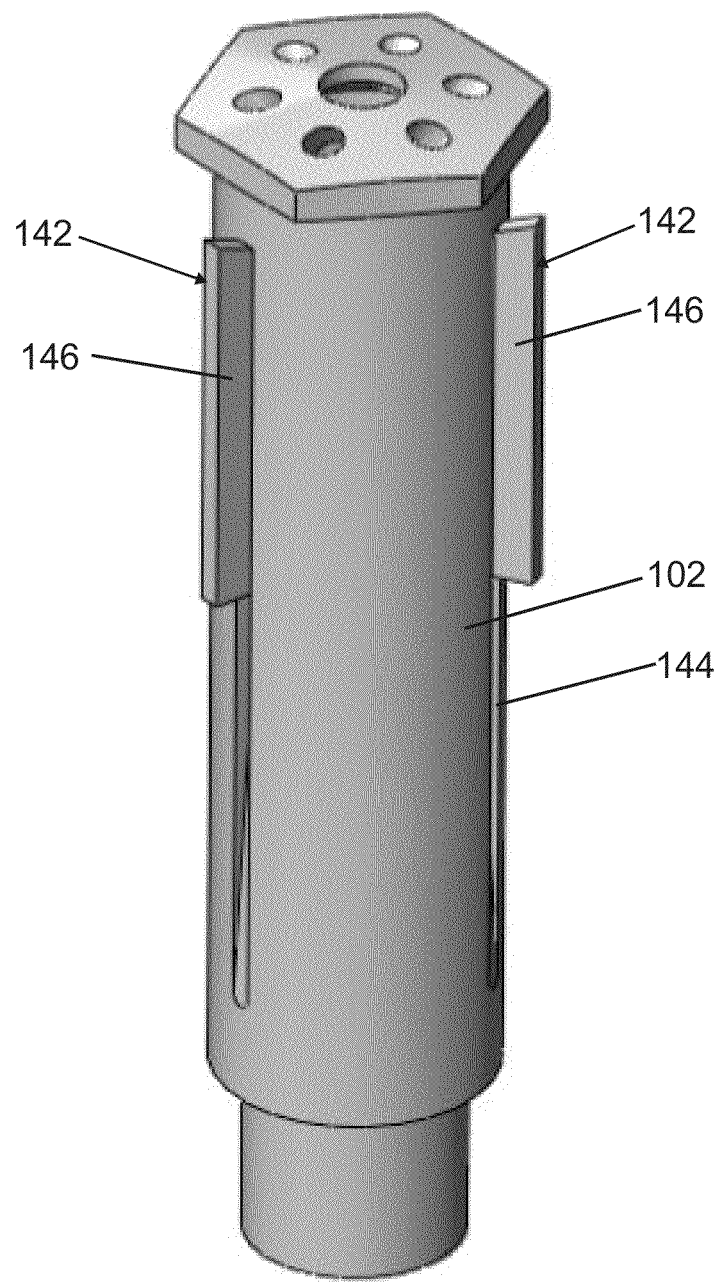
FIG. 6 depicts the inner tube of the burner apparatus of FIGS. 1 and 2 with centralizers.

Returning to FIGS. 1 and 2, to provide and maintain a symmetric flame, the inner tube 102 is preferably centered within the longitudinal bore 106 of the outer tube 104. This may be achieved through the use of one or more centralizers 142 which may be coupled to the exterior of the inner tube 102. Preferably, the centralizers 142 are relatively rigid to ensure that the inner tube 102 remains fixed in position relative to the outer tube 104 during operation of the burner apparatus. In one example, as illustrated in FIG. 6, each centralizer 142 may include a tapered slot 144 formed on the inner tube 102 and an adjustable wedge 146 arranged in the tapered slot 144. As more clearly shown in FIG. 5, the centralizers 142 are distributed around the circumference of the inner tube 102 to provide the desired centralizing function. Returning to FIGS. 1 and 2, the adjustable wedges 146 extend laterally and outwardly from the inner tube 102 to the inner diameter of the outer tube 104. In addition to centralizing the inner tube 102 within the bore 106, the adjustable wedges 146 may be used to establish and adjust the longitudinal position of the inner tube 102 relative to the outer tube 104. Such adjustments may be used to control the size of the combustion chamber 112. Other types of centralizers known in the art for centralizing a tubular member within another tubular member may be used.

A cooling jacket 150 surrounds the outer tube 104, which in turn surrounds the inner tube 102. The cooling jacket 150 may be mounted on the outer tube 104. The cooling jacket 150 includes a pocket 152 so that when it is mounted on, or otherwise positioned adjacent to, the outer tube 104, an annular space 154 is defined between the cooling jacket 150 and the outer tube 104. The annular space 154 serves as a conduit through which cooling gas can be circulated around the outer tube 104 and during operation of the burner apparatus 100. The cooling jacket 150 includes an inlet port 156 and an outer port 158, both of which are in communication with the annular space 154. The cooling jacket 150 may include an annular partition 155 disposed in the annular space 154 to create an inlet flow path 160 and an outlet flow path 162 within the annular space 154. The inlet flow path 160 is in communication with the inlet port 156, while the outlet flow path 162 is in communication with the outlet port 158. The partition 155 may be disposed in the annular space 154 such that gas in the inlet flow path 160 can flow into the outlet flow path 162. In this arrangement, cooling gas enters the cooling jacket 150 through the inlet port 156, flows through the inlet flow path 160 into the outlet flow path 162, flows through the outlet flow path 162 to the outlet port 158, and then out of the cooling jacket 150. In one example, both the inlet flow path 160 and outlet flow path 162 surround the outer tube 104, with the inlet flow path 160 being closer to the outer tube 104.

Referring to FIGS. 1 and 2, oxidant 164 is supplied to the annular space 110 through the port 124, and fuel 166 is supplied to the bore 108 through the port 116. The fuel exits the inner tube 102 through the nozzle 126 and mixes with the oxidant in the annular space 110 to form a flame (not shown). As the burner apparatus 100 operates, cooling gas 168 is supplied to the cooling jacket 150 through the port 156, and warmer cooling gas 170 is removed from the cooling jacket 150 through the port 158. In submerged combustion melting, the flame of the burner apparatus 100 is injected into a molten pool. If the burner apparatus 100 shown in FIG. 1 is used, the flame is formed within the burner and then injected into the molten pool. If the burner apparatus 100 shown in FIG. 2 is used, the flame is formed outside of the burner. In this case, the burner apparatus may be positioned such that the flame is formed within the molten pool. As noted above, the short broad flame produced by the burner apparatus can help reduce or eliminate freezing at the point where the flame is injected into the molten pool. This can ultimately help avoid formation of cold finger in the molten pool.

Figure 7:
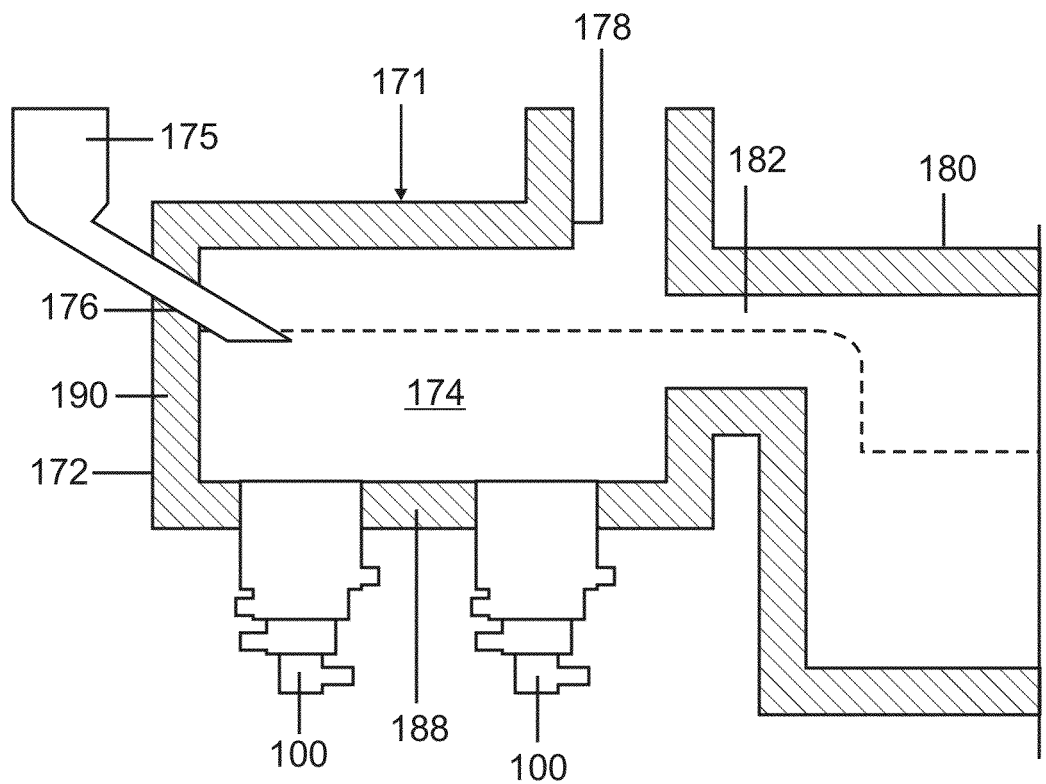
FIG. 7 depicts a submerged combustion melting system including the burner apparatus of FIG. 1 or 2.

FIG. 7 shows a submerged combustion melting apparatus 171 including a melting chamber 172 containing a molten pool 174. The melting chamber 172 includes a port 176 for feeding batch material from a hopper 175 into the melting chamber 172. The batch material may be provided in liquefied form. The melting chamber 172 also includes a port 168 through which exhaust gases can escape the melting chamber 172. The melting apparatus 171 also includes a conditioning chamber 180 connected to the melting chamber 172 by a flow passage 182. Molten material from the molten pool 164 flows from the melting chamber 172 to the conditioning chamber 180 through the flow passage 182 and then exits the melting apparatus 171. Orifices 186 are formed in the wall of the melting chamber 162. The orifices 176 are shown in the bottom wall 188 of the melting chamber 172. In alternate arrangements, the orifices 176 may be provided in the side wall 190 of the melting chamber 172. The orifices 186 may be perpendicular or slanted relative to the wall of the melting chamber 172. Burner apparatus 100 are arranged in the orifices 186 to inject flames into the molten pool 174.

The burner apparatus 100 may help prevent freezing at the point where the flames are injected into the molten pool 174 and ultimately avoid formation of cold finger in the molten pool 174. Cold finger is caused by a combination of the depth of the molten pool above the burner head and the velocity of the gases at the burner head. If the flame from the burner head cannot travel fast enough to burn in this area (i.e., above the burner head), there will be no heat in this area. As a result, this area is being cooled by the gases flowing through it and freezes into a tube shape. When the frozen melt is cracked open, the tube often looks like a finger, hence the term "cold finger." With the burner apparatus 100, the side holes (132 in FIG. 1) divert some of the gas from the inner tube (102 in FIG. 1) from the laminar flow regime. This helps push the combustion chamber (i.e., where the flame is formed) open. The protuberances (138 in FIG. 1) outside the inner tube deflects some of the gas from the outer tube. This also helps push the combustion chamber open and slows down the gas velocity in the combustion chamber. Both features promote mixing of the gases, creating more combustion sooner.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A submerged combustion melting apparatus, comprising:
a melting chamber for containing a molten pool of material being melted, said melting chamber having an orifice formed in a wall thereof below a surface of the molten pool; and
a burner positioned at the orifice to inject a flame into the melting chamber below a surface of the molten pool;
the burner comprising:
a first tube having a first longitudinal bore;
a second tube having a second longitudinal bore, said second tube being disposed within said first longitudinal bore such that an annular space is defined between the second tube and the first tube; and
a nozzle formed at a tip of the second tube, said nozzle comprising a plurality of side holes formed therein, said side holes being slanted outwardly relative to a longitudinal axis of the nozzle and being in communication with the second longitudinal bore;
protuberances formed on the nozzle, wherein each of said protuberances correspond laterally in position to the first a one of said side holes, and wherein each of the plurality of protuberances is provided by a corner of a polygonal flange attached to the tip of the second tube.

2. The melting apparatus of claim 1, wherein the second tube and the first tube include ports for receiving gas.

3. The melting apparatus of claim 1, wherein the plurality of side holes each have an elongated shape at an outlet face of the nozzle.

4. The melting apparatus of claim 1, wherein the nozzle further comprises a central hole, said central hole being in communication with the second longitudinal bore.

5. The melting apparatus of claim 1, further comprising means for centering the second tube in the first longitudinal bore.

6. The melting apparatus of claim 1, further comprising a cooling jacket surrounding the first tube.

7. The melting apparatus of claim 1, wherein each of the side holes is slanted outwardly at an angle in a range from 25° to 65° relative to a longitudinal axis of the nozzle.

8. The melting apparatus of claim 7, wherein the side holes are distributed around the center of the nozzle.

9. The melting apparatus of claim 8, wherein the nozzle further comprises a central hole, said central hole being in communication with the second longitudinal bore.

10. The melting apparatus of claim 1, wherein the nozzle is substantially flush with an end surface of the burner apparatus.

11. The melting apparatus of claim 1, wherein the nozzle is recessed relative to an end surface of the burner apparatus.

12. The melting apparatus of claim 1, wherein the side holes terminate at an outlet face of the nozzle with an elongated shape.

13. The melting apparatus of claim 1, wherein a cross-sectional flow area of the annular space and a cross-sectional flow area of the nozzle are selected such that pressure in the annular space is substantially equal to pressure in the second longitudinal bore.

14. The melting apparatus of claim 1, wherein the side holes are distributed around the center of the nozzle.

15. A submerged combustion melting apparatus, comprising:
   a melting chamber for containing a molten pool of material being melted, said melting chamber having an orifice formed in a wall thereof below a surface of the molten pool; and
   a burner positioned at the orifice to inject a flame into the melting chamber below a surface of the molten pool;
   the burner comprising:
   a first tube having a first longitudinal bore;
   a second tube having a second longitudinal bore, said second tube being disposed within said first longitudinal bore such that an annular space is defined between the second tube and the first tube; and
   a nozzle formed at a tip of the second tube, said nozzle comprising a plurality of side holes formed therein, said side holes being slanted outwardly relative to a longitudinal axis of the nozzle and being in communication with the second longitudinal bore,
      wherein each of the side holes is slanted outwardly at an angle in a range from 25° to 65° relative to a longitudinal axis of the nozzle,
      wherein the side holes are distributed around the center of the nozzle, and
      wherein the nozzle further comprises a central hole, said central hole being in communication with the second longitudinal bore.

16. The melting apparatus of claim 15, wherein the second tube and the first tube include ports for receiving gas.

17. The melting apparatus of claim 15, wherein the plurality of side holes each have an elongated shape at an outlet face of the nozzle.

18. The melting apparatus of claim 15, further comprising means for centering the second tube in the first longitudinal bore.

19. The melting apparatus of claim 15, further comprising a cooling jacket surrounding the first tube.

* * * * *